(12) United States Patent
Roth et al.

(10) Patent No.: US 8,665,537 B2
(45) Date of Patent: Mar. 4, 2014

(54) MODIFIED RETROFOCUS-TYPE WIDE-ANGLE LENS

(71) Applicant: Leica Camera AG, Solms (DE)

(72) Inventors: Stefan Roth, Schlüchtern (DE); Peter Karbe, Leun (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 13/929,018

(22) Filed: Jun. 27, 2013

(65) Prior Publication Data

US 2014/0002910 A1    Jan. 2, 2014

(30) Foreign Application Priority Data

Jun. 28, 2012 (DE) .................. 10 2012 105 707

(51) Int. Cl.
*G02B 13/04* (2006.01)
*G02B 13/18* (2006.01)

(52) U.S. Cl.
USPC .......................... 359/749; 359/750

(58) Field of Classification Search
CPC ......... G02B 13/04; G02B 13/18; G02B 13/24
USPC .......... 359/749, 750, 751, 752, 753, 783, 784
See application file for complete search history.

(56) References Cited

U.S. PATENT DOCUMENTS

| | | | |
|---|---|---|---|
| 4,558,928 A | 12/1985 | Imaizumi | |
| 5,909,319 A | 6/1999 | Matsui | |
| 6,137,638 A | 10/2000 | Yamagishi et al. | |
| 6,687,061 B2 * | 2/2004 | Sensui | 359/749 |
| 7,505,211 B2 * | 3/2009 | Horneber | 359/680 |
| 8,203,798 B2 * | 6/2012 | Takato | 359/753 |
| 2009/0219624 A1 | 9/2009 | Yamamoto et al. | |
| 2011/0002046 A1 | 1/2011 | Wada et al. | |
| 2011/0304922 A1 | 12/2011 | Ichimura | |
| 2013/0163094 A1 * | 6/2013 | Takada et al. | 359/684 |

FOREIGN PATENT DOCUMENTS

| | | |
|---|---|---|
| DE | 33 45 987 A1 | 7/1984 |
| EP | 1 978 393 A1 | 10/2008 |
| JP | 2006-162700 A | 6/2006 |

OTHER PUBLICATIONS

European Search Report, Sep. 12, 2013, 1 page.

* cited by examiner

*Primary Examiner* — David N Spector
(74) *Attorney, Agent, or Firm* — Foley & Lardner LLP

(57) ABSTRACT

What is described is a modified retrofocus-type wide-angle lens, with, as seen from the object, a front group (G1) with negative refractive power, a first rear group (Gh1) with positive refractive power displaceable along the optical axis for focusing purposes and a second rear group (Gh2) with positive refractive power facing an image plane.

12 Claims, 2 Drawing Sheets

MODIFIED RETROFOCUS-TYPE WIDE-ANGLE LENS

CROSS-REFERENCE TO RELATED PATENT APPLICATIONS

The right of foreign priority is claimed under 35 U.S.C. §119(a) based on Federal Republic of Germany Application No. 10 2012 105 707.9, filed Jun. 28, 2012, the entire contents of which, including the specification, drawings, claims and abstract, are incorporated herein by reference.

BACKGROUND OF THE INVENTION

The invention relates to a photographic modified retrofocus-type wide-angle lens.

U.S. Pat. No. 5,909,319 A has disclosed a lens in which the overall length does not change over the whole focusing path. As seen from the object side, the lens has, in the light direction, a first lens unit group with overall positive refractive power which contains a negative lens unit. The second and third lens unit groups, as seen in the light direction, each consist of a cemented element with negative refractive power and the fourth lens unit group has positive refractive power. The lens elements two and three are displaceably mounted for focusing purposes.

DE 33 45 987 A1 has disclosed a telephoto lens, in which the front lens unit group has positive refractive power, the intermediate lens unit group has negative refractive power and a rear lens unit group has positive refractive power. The intermediate lens unit group is subdivided into two subgroups, wherein the lens is focused by moving the two subgroups toward the image side while modifying the distance between the subgroups.

SUMMARY OF THE INVENTION

As seen from the object, photographic retrofocus-type lenses have a front lens unit group with negative refractive power (front group) and a rear lens unit group with positive refractive power (rear group). Retrofocus-type lenses are also referred to as inverted telephoto-type lenses. In order to restrict the aperture of the incident beams, an aperture stop is usually arranged either between the front group and the rear group or within the rear group in these lenses. In such lenses, the whole lens group arranged behind the stop (rear group) is usually displaced axially with respect to the optical axis. This type of focusing in retrofocus-type lenses causes aberrations, such as astigmatic difference of focus, transverse chromatic aberration and field curvature, to amplify or change during focusing. The correction state of the lens in the near-field range is therefore unsatisfactory.

A further problem of these lenses is that the focusing paths are often unsuitable for fast focusing, as is required for e.g. autofocusing purposes.

It is one object of one embodiment of the invention to remove the field curvature and the transverse chromatic aberration, known in retrofocus-type lenses, to the largest possible extent and to avoid large aberrations and a deterioration of the imaging quality during focusing.

It is one further object of one embodiment of the invention to ensure a correction state of the lens over the whole distance setting range, but in particular in the near-field range down to an object distance of approximately 0.4 m, which stays as constant as possible and, at the same time, to improve the suitability for autofocus purposes.

In a photographic lens of the type mentioned at the outset, these problems are achieved by features set forth herein.

In respect of the features of solutions herein, it should be noted that in modern optical designs, use is usually made of automatic correction programs, such as e.g. "code V" by Optical Research Associates, which are able to calculate proposals for functional lens systems with a correction state optimized for a particular object from predetermined lens unit sequences and refractive power distributions. As a result of targeted modifications of the specified parameters by the optical unit designer, the automatically obtained correction state is improved further in each case.

This already renders it possible to obtain the design data for radii, lens unit thicknesses, lens unit distances, refractive indices and Abbe numbers of the optical glasses to be used from the features of Claim 1. The design parameters can be incrementally improved in a targeted fashion when the features specified in the dependent claims are taken into account.

Further objects, features and advantages of the present invention will become apparent from the detailed description of preferred embodiments that follows, when considered together with the accompanying figures of drawing.

BRIEF DESCRIPTION OF THE DRAWINGS

The drawing illustrates, true to scale, an exemplary embodiment of a lens according to the invention. Here.

DETAILED DESCRIPTION OF THE PREFERRED EMBODIMENTS

Figure 1:
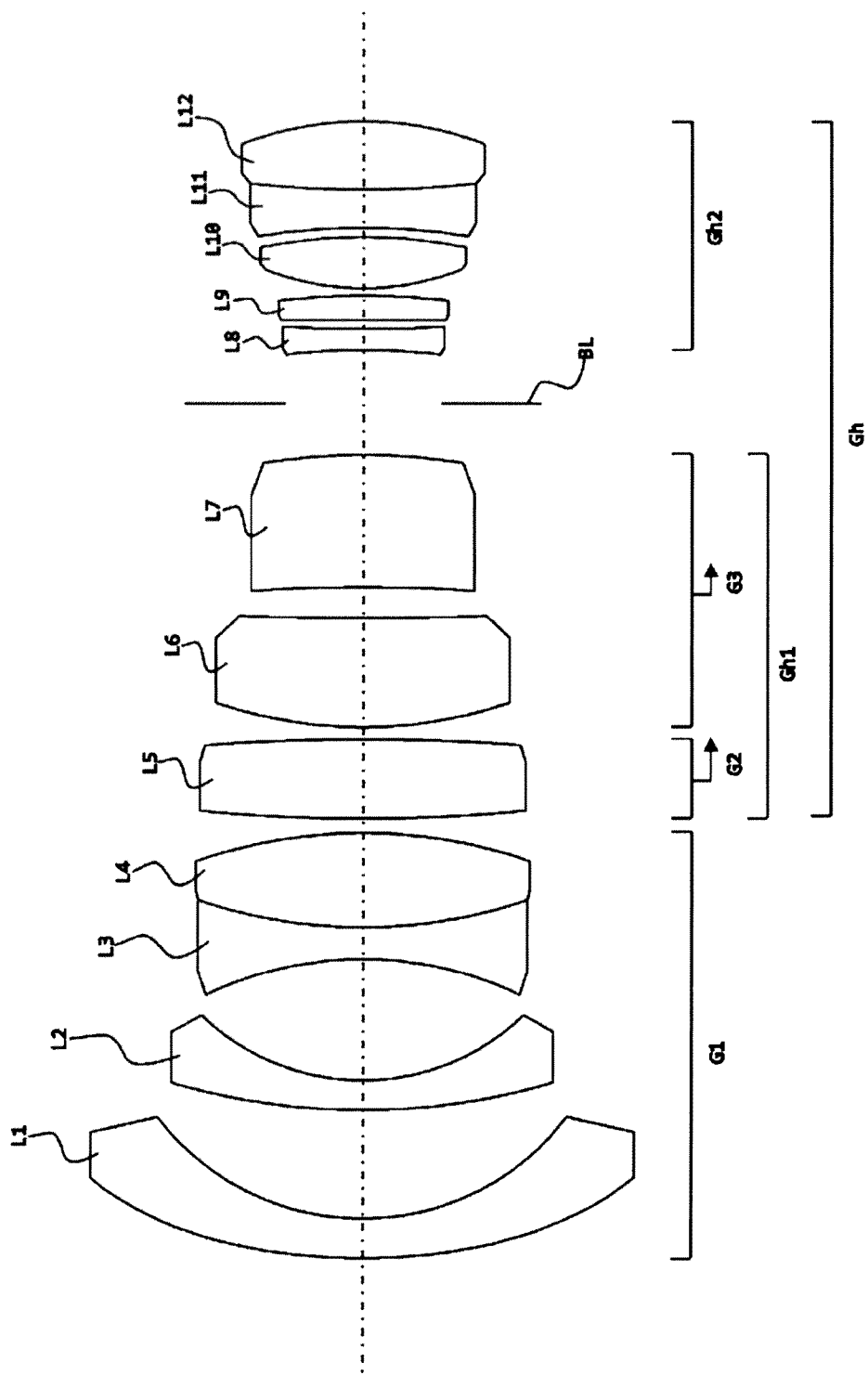
FIG. 1 shows a lens unit section through a lens when focusing on an object at infinity.

FIG. 1 illustrates the subdivision of the lens, as seen in the light direction, into a front lens group (G1) with negative refractive power and a rear group (Gh) with positive refractive power, which is associated with an image plane (not illustrated in any more detail). The rear group (Gh) has a first rear group (Gh1) with positive refractive power, displaceable along the optical axis (illustrated by a dashed line) for focusing purposes, and a second rear group (Gh2) with positive refractive power facing the image plane. The distance between the front group (G1) and the second rear group (Gh2) remains constant during focusing. An aperture stop (BL) is arranged in a stationary fashion between the first rear group (Gh1) and the second rear group (Gh2). According to embodiments of the invention, the first rear group (Gh1) consists of two lens unit groups (G2, G3) with positive refractive power and is displaceably mounted in the direction of the second rear group (Gh2) or the aperture stop (BL) for focusing from infinity to the near-field range. The movement direction is illustrated by arrow specifications at the reference signs G2 and G3, wherein a different adjustment travel is associated with the arrow lengths. A longer arrow means a greater adjustment travel and a shorter arrow means a shorter adjustment travel during focusing. The illustrated arrow length is not true to scale with respect to the length of the movement and merely serves for clarification purposes.

In a preferred embodiment, the front group (G1) consists of four lens elements (L1, L2, L3, L4), wherein the first two lens elements (L1, L2) have negative refractive power and the third and fourth lens elements (L3, L4) are combined to form a cemented element with an overall weak negative refractive power between −1 and 0 diopter. In an alternative embodiment, it is also possible to realize weak positive refractive powers between 0 and 1 diopters, without these causing undesired disadvantages in the imaging power.

The glasses of the first two lens elements (L1, L2) with negative refractive power have neutral or positive anomalous partial dispersion. This advantageously renders it possible to minimize secondary transverse chromatic aberrations, which would otherwise have a negative effect on the quality of the image.

The first and second lens elements (L1, L2) of the front group (G1) are formed as convex/concave meniscus lenses and are made of highly refractive glasses (n>1.80). The retrofocus design with negative refractive power front lens units brings about great distortion in the image plane. In order to minimize these aberrations, the first lens element (L1) preferably has an aspherical surface on the first side in the light direction. A further advantage of this aspherical design includes the fact that the chief rays for different image angles impinge on the first lens unit surface in a manner very well spatially separated from one another. Alternatively, the distortion can also be corrected by placing an additional lens unit with positive refractive power in front of the lens unit (L1) instead of the aspherical surface. The radii of curvature of the first and second lens units (L1, L2) are preferably designed in such a way that, as a result, an object angle of greater than 95° is captured. These properties of the first lens element (L1) and the second lens element (L2) bring about a very good correction of the distortion over the whole image field.

As first lens unit surface of the lens, the aspherical outer surface of the lens element (L1) is particularly exposed to the environmental influences acting from the outside and it therefore advantageously consists of glass with a high Knoop hardness (>600) and high acid resistance, i.e. it has a low acid resistance class (SR<=2). The outer surface of the lens unit (L1) is additionally provided with the usual optical coatings, e.g. a water and dirt repellent layer, for protection purposes.

The third lens element (L3) advantageously has negative refractive power and consists of glass with particularly low dispersion and high positive anomalous partial dispersion. The fourth lens element (LA) has positive refractive power and consists of glass with medium-range dispersion. In one embodiment of the third lens element (L3) as a bi-concave lens unit and of the fourth lens element (L4) with bi-convex shape, a cemented element can be formed in a particularly simple fashion. This makes it possible to control the great sensitivities, which usually exist, in view of distance-, thickness- and centering errors of the third and fourth lens units (L3, L4). A further advantage of embodying the third lens element (L3) as a bi-concave lens unit and the fourth lens element (L4) as a bi-convex lens unit and combining these in a cemented element includes the fact that the primary longitudinal chromatic aberration and the secondary transverse chromatic aberrations are corrected without amplifying other aberrations such as curvature and distortion.

In a further embodiment, the first group (G2) of the first rear group (Gh1) is formed by a lens unit (L5) with positive refractive power and a bi-convex shape. The second group (G3) of the first rear group (Gh1) consists of two lens units (L6, L7), each with positive refractive power, which, in the light direction, have a convex/concave (L6) and concave/convex (L7) shape. This renders it possible, in a particularly advantageous fashion, to reduce the large Petzval sum and occurring transverse chromatic aberrations which are usually caused by a retrofocus design with a negative first lens unit group (G1).

When dimensioning lenses with very short focal lengths, the lens units with positive refractive power, in the present case those of the second and third group (G2, G3), tend to have very large central thicknesses when attempting to correct the field curvature. In addition to inexpedient lengthening of the path through glass, which increases the absorption in the short-wavelength spectral range, this often results in calculated lens thicknesses which can no longer be mechanically arranged with respect to one another. An absorption in the short-wavelength spectral range results in a yellowish color reproduction in the image.

In order to minimize the absorption in the glass path, while at the same time having good correction of the Petzval sum and transverse chromatic aberration, glass with a medium-range Abbe number (40<=v<=65) is advantageously selected for the fifth lens unit (L5) of the second group (G2) and glasses with a low Abbe number (v<40) are advantageously selected for the sixth and seventh lens units (L6, L7) of the second group (G3) of the first rear group (Gh1). This provides good compensation for the transverse chromatic aberration.

Alternatively, individual ones of the lens elements (L5, L6, L7) can also be embodied as cemented elements consisting of two lens units in order to compensate for the transverse chromatic aberration. However, this increases the number of lens units in the lens.

In an advantageous embodiment of the lens, the second rear group (Gh2) has an overall positive refractive power and consists of five lens elements (L8, L9, L10, L11, L12), with, in the light direction, negative (L8), positive (L9) and positive (L10) refractive power. The last two lens units (L11, L12) are combined to form a cemented element with an overall negative refractive power in order to improve the tolerance sensitivity in respect of distance-, thickness- and centering errors.

The first lens unit (L8) of the second rear group (Gh2) is a bi-concave lens and consists of glass with a high refractive index (here n>1.7) and anomalous partial dispersion. This corrects the secondary longitudinal chromatic aberration and the secondary transverse chromatic aberration. In order to compensate for spherical aberrations, for example of a subsequent lens with a particularly large positive refractive power, the first lens unit (L8) of the second rear group (Gh2) is, in a particularly advantageous fashion, embodied as a one-sided or two-sided aspherical lens and arranged at a short distance behind the aperture stop (BL).

As a result of this, the lens unit (L8) has the smallest external diameter compared to the remaining lens units of the lens and can be manufactured in a cost-effective manner and in great numbers as a blank-pressed aspherical lens.

In order to correct the secondary longitudinal chromatic aberrations and the secondary transverse chromatic aberrations, the lens units (L9, L10) with positive refractive power consist of glasses with particularly low dispersion and high positive anomalous partial dispersion. Here, the tenth lens (L10) has a particularly high positive refractive power (+28 dpt), while the ninth lens (L9) has a lower positive refractive power (+6 dpt). This allows the Petzval sum to be corrected to a good level.

The eleventh lens element (L11) has negative refractive power and is advantageously a lens unit with a bi-concave shape, while the twelfth lens element (L12) has positive refractive power and is embodied as a bi-convex lens unit. The lens units L11 and L12 are preferably combined as cemented element. Advantageously, the second surface in the light direction of the bi-concave eleventh lens (L11) of the cemented element and the first surface in the light direction of the bi-convex twelfth lens (L12) are curved approximately concentrically with respect to the axial image point in the image plane. This allows good correction of the distortion. In order to correct the longitudinal chromatic aberration and the transverse chromatic aberration, the lens (L11) of the cemented element is formed from glass with a particularly low Abbe number (v<40.0) and the bi-convex lens (L12) is made of glass with a particularly high Abbe number (v>65.0) and positive anomalous partial dispersion.

The first rear group (Gh1) is, for the purposes of focusing from the infinity setting in the direction of the near-field range, displaced away from the front group (G1) in the light direction toward the aperture stop (BL) and has the function of the focusing lens unit group.

In order to achieve particular suitability for autofocus applications, the axial adjustment travel of the focusing lens unit group (Gh1) made during the focusing from infinity to the near-field range must be selected to be as short as possible. A short focus travel is realized by virtue of the fact that the lens elements of the focusing lens unit group (Gh1) have high refractive power. However, as a result of the high refractive power, the aberrations change significantly over the distance adjustment range. In the focusing setting on an object in the near-field range, this leads to an insufficient correction state of the lens. This leads to field curvature which is difficult to correct and significant transverse chromatic aberrations, particularly in retrofocus-type wide-angle lenses.

The correction state of the lens in the near-field range is, according to embodiments of the invention, improved by virtue of the fact that the two lens unit groups (G2, G3) of the focusing lens unit group (Gh1) are separated during the focusing process and displaced by different absolute values (a so-called floating function).

Figure 2A:
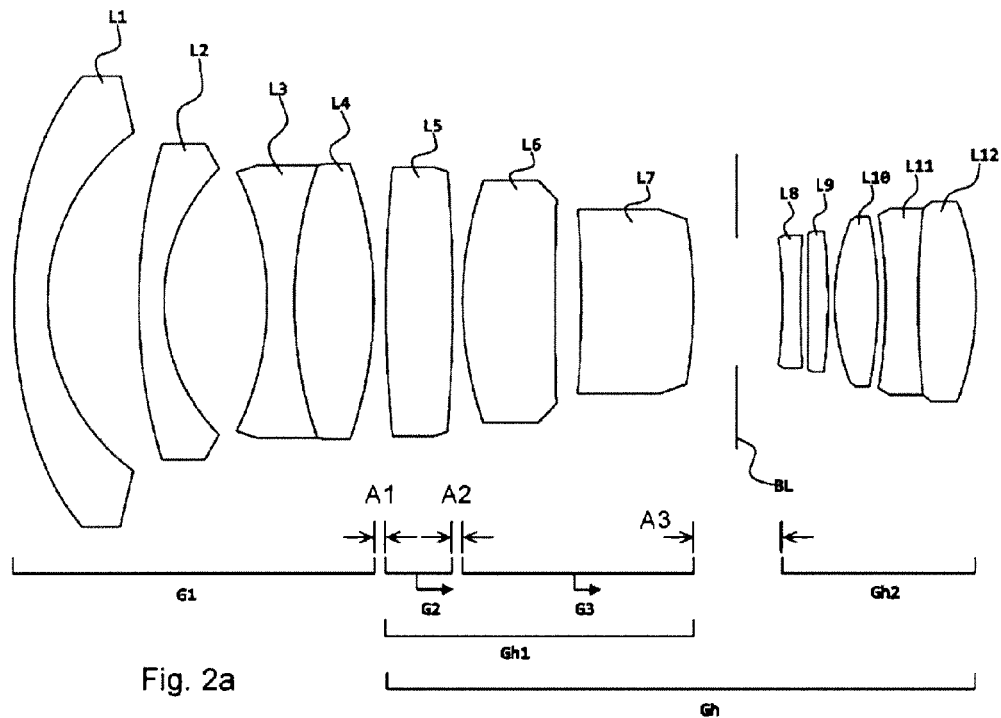
FIG. 2*a* shows the same lens unit section through a lens when focusing on an object at infinity with distance specifications at the second and third lens unit groups.

In FIG. 2a, the lens is, just like in FIG. 1, illustrated in the focusing setting on an object at infinity and was, in order to clarify the position of the focusing lens unit group Gh1 with the lens unit groups G2 and G3, complemented by the distance specifications between the groups G1 and G2 (A1), G2 and G3 (A2) and G3 and Gh2 (A3).

Figure 2B:
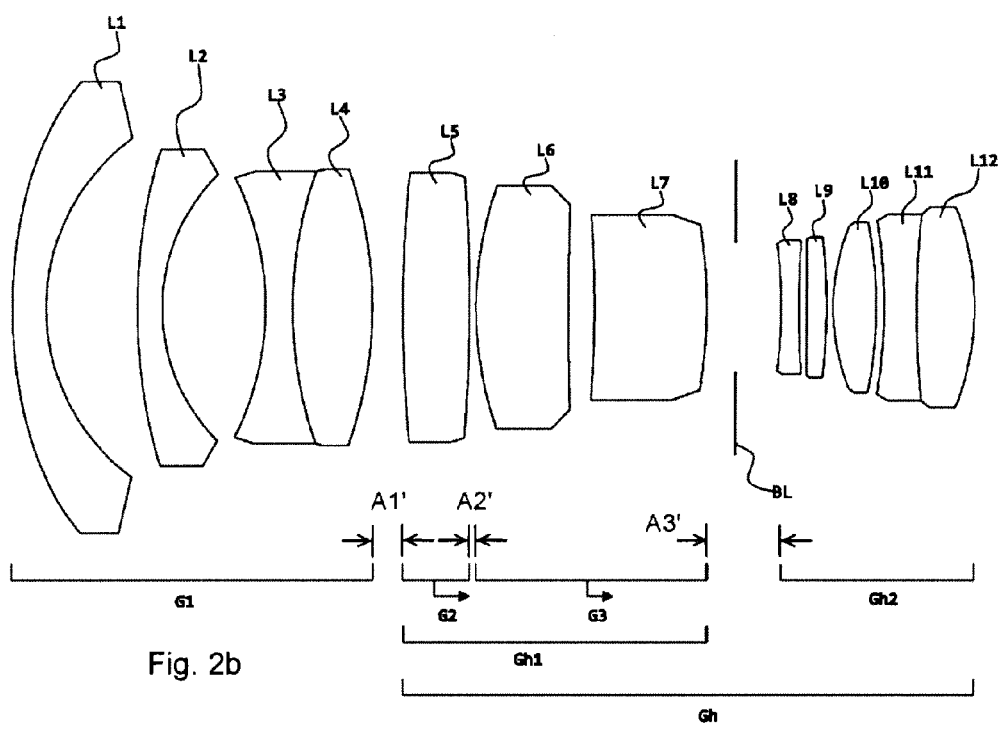
FIG. 2*b* shows a lens unit section through a lens when focusing on an object in the near-field range with modified distance specifications at the second and third lens unit groups.

In FIG. 2b, the lens is illustrated in the focusing setting on an object in the near-field range. The difference in the axial distances A' of the lens unit groups G2 and G3 on the optical axis (not illustrated in any more detail) clearly shows the short focus travel. As a result of the distance A2' between the lens unit groups G2 and G3, which is illustrated as being very narrow in FIG. 2b compared to FIG. 2a, it becomes clear that the lens element G2 is displaced by a greater axial absolute value during the change in focus from an object at infinity to an object in the near-field range than the lens unit group G3. In actual fact, the lens unit group G2 is displaced by approximately 3 mm and the lens unit group G3 is displaced by approximately 2.5 mm in the direction of the aperture stop BL.

The distance A1 between the front group (G1) and the first rear group (Gh1) increases in the process to the distance A1' illustrated in FIG. 2b, while at the same time the distance A3 between the third lens unit group (G3) and second rear group (Gh2) reduces to the distance A3' (see FIG. 2b).

In conjunction with a mutually tuned correction of the lens unit groups G2 and G3 over the whole adjustment range (from infinity to the near field), it is possible, together with the floating function, to obtain an unchanging correction state of the lens with hardly changing aberrations.

The drawing shows a lens with a focal length f=24 mm, an aperture of 1:3.5 and an object angle of greater than 95°.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

LIST OF REFERENCE SIGNS

L1 Aspherical lens unit, meniscus lens with negative refractive power
L2 Lens unit with negative refractive power
L3 Bi-concave lens unit with negative refractive power
L4 Bi-convex lens unit with positive refractive power
L5 Bi-convex lens unit with positive refractive power
L6 Convex/concave lens unit with positive refractive power
L7 Concave/convex lens unit with positive refractive power
L8 Aspherical bi-concave lens unit with negative refractive power
L9 Bi-convex lens unit with positive refractive power
L10 Bi-convex lens unit with positive refractive power
L11 Bi-concave lens unit with negative refractive power
L12 Bi-convex lens unit with positive refractive power
G1 Front lens group
G2, G3 Lens unit groups of the focusing lens unit group
Gh1 First rear group, focusing lens unit group
Gh2 Second rear group
Gh Rear group
BL Aperture stop

What is claimed is:

1. Modified retrofocus-type wide-angle lens, with, as seen from the object, a fixed front group with negative refractive power, a first rear group with positive refractive power displaceable along the optical axis for focusing purposes, a fixed second rear group with positive refractive power facing an image plane, and an aperture stop arranged in stationary fashion between the first rear group and the second rear group, wherein the first rear group comprises two groups with positive refractive power, which can be displaced separately in the direction of the second rear group for focusing from infinity to the near-field range, wherein the distance between the two lens unit groups of the first rear group reduces during the focusing from infinity to the near-field range.

2. Modified retrofocus-type wide-angle lens according to claim 1, wherein the first group of the first rear group is formed by a lens unit with positive refractive power and the second group of the first rear group has two lens units, each with positive refractive power.

3. Modified retrofocus-type wide-angle lens according to claim 1, wherein the second rear group with overall positive refractive power has five lens elements, wherein the two last lens units are combined to form a cemented element with an overall negative refractive power, in which the eleventh lens element has negative refractive power and the twelfth lens element has positive refractive power.

4. Modified retrofocus-type wide-angle lens according to claim 1, wherein a second group of the first rear group is embodied as a lens unit with a medium range Abbe number 40<=v<=65 and the lens units of the second group of the first rear group consist of glasses with a low Abbe number.

5. Modified retrofocus-type wide-angle lens according to claim 1, wherein the first rear group for focusing from the infinity setting in the direction of the near-field range can be displaced away from the front group in the light direction to the aperture stop, wherein a first lens unit group of the first rear group covers a greater distance than a second lens unit group of the first rear group.

6. Modified retrofocus-type wide-angle lens according to claim 1, wherein the front group consists of four lens elements, wherein the first two lens elements have negative refractive power and the third and fourth lens elements are combined to form a cemented element with an overall weak negative refractive power between −1 and 0 diopter.

7. Modified retrofocus-type wide-angle lens according to claim 6, wherein the third lens element has negative refractive power and consists of glass with a particularly high Abbe number v>65 and high positive anomalous partial dispersion and the fourth lens element has positive refractive power and consists of glass with a medium range Abbe number 65.0>v>40.0.

8. Modified retrofocus-type wide-angle lens according to claim 1, wherein first and second lens elements of the front group are formed as convex/concave meniscus lenses and have highly refractive glasses n>1.80, wherein the first lens element has an aspherical surface on the first side in the light direction and consists of glass with a high Knoop hardness >600 and high acid resistance, low acid resistance class SR<=2.

9. Modified retrofocus-type wide-angle lens according to claim 8, wherein the radii of curvature of the first and second lens elements enable the capture of an object angle of greater than 95°.

10. Modified retrofocus-type wide-angle lens according to claim 1, wherein the second rear group comprises four elements with, in the light direction, negative, positive, positive and negative refractive power, wherein the last element of the system is embodied as a cemented element with a bi-concave lens unit with negative refractive power and a bi-convex lens unit with positive refractive power.

11. Modified retrofocus-type wide-angle lens according to claim 10, wherein a first lens unit of the second rear group is embodied as a one-sided or two-sided aspherical lens with a small external diameter compared to the remaining lens units of the lens and the lens units, following in the light direction, with positive refractive power consist of glasses with a particularly high Abbe number v>65 and high positive anomalous partial dispersion.

12. Modified retrofocus-type wide-angle lens according to claim 10, wherein the bi-concave lens unit of the cemented element consists of glass with a particularly low Abbe number v<40 and the bi-convex lens unit consists of glass with a particularly high Abbe number v>65 and positive anomalous partial dispersion.

* * * * *